United States Patent
Nelson et al.

[11] Patent Number: 6,131,681
[45] Date of Patent: Oct. 17, 2000

[54] WINTER FRONT ASSEMBLY

[76] Inventors: Chris Nelson, 8220 Stevens Ave. South, Bloomington, Minn. 55420; James P. LeClaire, 1256 Eleanor Ave., St. Paul, Minn. 55116

[21] Appl. No.: 09/173,068

[22] Filed: Oct. 16, 1998

[51] Int. Cl.[7] .................................................. B62C 1/00
[52] U.S. Cl. ........................ 180/68.1; 180/68.4; 180/68.6
[58] Field of Search .................................. 180/68.1, 68.2, 180/68.3, 68.4, 68.6

[56] References Cited

U.S. PATENT DOCUMENTS

| | | | |
|---|---|---|---|
| 764,893 | 7/1904 | Jones et al. | 123/41.6 |
| 764,922 | 7/1904 | Davis | 55/482.1 |
| 1,863,015 | 6/1932 | Kamrath | 180/68.3 |
| 2,067,639 | 1/1937 | Lett | 160/69 |
| 2,792,254 | 5/1957 | Hagglund | 296/91 |
| 3,863,728 | 2/1975 | Mittendorf | 180/68.6 |
| 4,523,657 | 6/1985 | Kooyumjian | 180/68.1 |
| 4,750,549 | 6/1988 | Ziegler et al. | 180/68.1 |
| 4,883,139 | 11/1989 | Gross | 180/68.6 |
| 5,718,283 | 2/1998 | Naty et al. | 180/68.6 |

*Primary Examiner*—Brian L. Johnson
*Assistant Examiner*—James S. McClellan
*Attorney, Agent, or Firm*—Peter A. Borsari

[57] ABSTRACT

The invention relates to a winterfront composed of a porous material which restricts cold ram air but provides a continuous and uniform air flow across the full frontal area of a vehicle's grill and to its cooling system. In one embodiment, the present invention provides a porous winterfront bound within a frame suitable for mounting to the grill of a vehicle. In a second embodiment, the winterfront of the present invention is a composite structure having inner and outer screen layers secured to a mountable frame and a porous fibrous web disposed in a pocket between the two screen layers.

14 Claims, 3 Drawing Sheets

WINTER FRONT ASSEMBLY

FIELD OF INVENTION

The present invention generally relates to the field of winterfront assemblies to restrict the flow of cold air through the grill of a moving vehicle. More particularly, the present invention relates to winterfront assemblies which provide a restricted, yet uniform, airflow across the heat exchanger assembly(s) in a vehicle cooling system to prevent over-cooling and undercooling in cold weather conditions.

BACKGROUND OF THE INVENTION

One of the primary causes of vehicle engine failure is due to overheating. Cooling systems have been developed and designed over the years to maintain proper air flow across an engine's heat exchanger assembly(s). The three most common heat exchangers effected by the flow of cold air are the radiator, the A/C condenser and the charger air cooler (CAC). The CAC is located in front of the radiator and usually has between about a third and a fourth less surface area than the radiator. The CAC is a heat exchanger which cools the air exiting the turbocharger to a temperature optimal for re-introduction back into the engine through the intake manifold. Air leaving the turbocharger and entering the CAC is approximately 400° F. Air exiting the CAC is approximately 150° F. The CAC is an air-to-air heat exchanger; the fluid flow through the core and the fluid flow in the core are both the same. This is a low capacitance system which reacts quickly to temperature change.

Cooling systems are designed to operate with air flowing freely through the radiator and charge air cooler. However, during cold weather periods, cold air strikes the entire front surface of the grill of a moving vehicle and flows through the vehicle's heat exchanger assembly(s), thereby over-cooling these assemblies. Numerous attempts have been made in the prior art to prevent over-cooling of an engine's heat exchanger assemblies, the most of common of which is a device known as a winterfront. In general, a winterfront is a device which restricts the flow of cold air through the vehicle's heat exchanger assembly(s).

Winterfronts have found widespread use, particularly within the trucking industry. The most common type of winterfronts are designed to be mounted to the truck's grill, in order to block off a portion of the grill, thus decreasing the total amount of cold air impacting the cooling system and reducing the chance of over-cooling. For instance, U.S. Pat. No. 4,523,657 to Kooyumjian provides a winterfront composed of four polygonal sections of weather resistant fabric which are arranged over a truck's grill in such a manner to provide an adjustable central opening to restrict the flow of cold air impacting on the grill. Another example of a winterfront having a centralized opening is disclosed in U.S. Pat. No. 5,267,624 to Christensen. Christensen's winterfront comprises a centrally disposed, octagonal oval opening and an auxiliary X-shaped cover member which crosses the oval opening. U.S. Pat. Nos. 4,883,139 and Re 34,907 to Gross disclose a winterfront assembly which comprises a plurality of separate panel elements, each element being mounted within one of the grill's recesses.

Although winterfronts are effective in restricting the amount of cold air from striking the vehicle's heat exchanger assembly(s), there are serious drawbacks associated with the use of current winterfronts. Cooling systems require the free flow of air to run effectively. In fact, a recent study has suggested that an estimated 100,000 charge-air coolers will fail in 1998. The primary reason for this rate of failure is differential temperatures which cause thermal stresses in the CAC and radiator core. If a winterfront is arranged over a grill in such a manner that the air flow path is perpendicular to the path of the charge air flow, the cold air passing over the cooling tubes will decrease their expansion, while those tubes not receiving cool air through the winterfront will remain expanded. Thus, the covered areas will be hotter than the uncovered areas resulting in a differential stress. This discrepancy creates an inconsistent structural change to the tubes for which the charge air cooler cannot compensate and leads to fatigue failures. In addition to thermal stresses in the heat exchangers, fan stresses are developed in the fan blades by the loading and unloading of the airfoil as it passes the opening(s) disposed in the winterfront.

Current winterfronts concentrate the flow of cold air through one or more openings. Mechanical stresses are created by the distribution of flow across the frontal area of the cooling system component. If the openings are in proximal alignment to the center of the cooling component, the mechanical bending stresses are increased about the periphery. Truck manufacturers warn that improperly covering the grill in cold weather operation will interfere with the air flow which can result in under cooling. Under cooling can lead to excessive fan drive engagement and reduction of truck power due to fan rotation.

In addition to the above-described winterfronts, other types of assemblies have been developed for mounting to the grill of a vehicle. Curtain and shutter devices have been used as air-shielding or air-regulating assemblies for mounting to a vehicle grill. In U.S. Pat. No. 1,367,031 to Fedders a radiator curtain is described composed of a woven wire or similar fabric having three different sections of mesh such that the passage of air is obstructed. Other examples of curtains or shutters are disclosed in U.S. Pat. No. 1,818,328 to Hess, U.S. Pat. No. 2,198,123 to McCoy and U.S. Pat. No. 2,246,823 to Vollberg et al.

Another type of device which has been used in the prior art is the protective screen or filter to prevent insects, pollutants and other road debris from entering through a vehicle's grill and contaminating the engine and cooling system. An early example of such a screen is shown in U.S. Pat. No. 2,854,086 to Schmidt which discloses a conventional screen for preventing insects and dirt from passing through the grill and onto the engine. U.S. Pat. No. 3,815,700 to Mittendorf discloses a vehicle insect protection apparatus having a screen made of a plastic, fiberglass or metal material. U.S. Pat. No. 4,236,592 to Ziegler provides a structure for protecting the front surfaces of moving vehicles from insects and debris and modulating air flow through the vehicle radiator to control cooling efficiency. The Ziegler structure may be in the form of a cover of a screen material or of an impervious material for use during cold weather to limit and control air flow.

Despite the advances in the prior art, a need still exists for a winterfront which is capable of restricting the amount of cold air impacting a vehicle's heat exchanger assembly(s) but which provides a continuous and uniform flow of air across the entire frontal area of the cooling system. Such a winterfront should not compromise, but rather should maintain, the original flow configuration designed by the original equipment manufacturer, (OEM) which exposes the full frontal area of the cooling system to ambient and ram air conditions while at the same time should be capable of metering the impact of cold air in cold weather conditions. In addition, such a winterfront should provide a uniform air flow which decreases the mechanical and thermal stresses on the cooling systems components as well as reduce fan stresses.

SUMMARY OF THE INVENTION

Accordingly, it is an object of the present invention to provide a winterfront which provides a continuous and uniform flow of air across the entire frontal area of a vehicle's cooling system while restricting the amount of cold ram air during cold weather operation.

It also is an object of the present invention to provide a winterfront which does not compromise the original flow configuration designed by the OEM.

It is a further object of the present invention to provide a winterfront which decreases the mechanical and thermal stresses on cooling system components as well as reduce fan stress.

It is an additional object of the present invention to provide a winterfront which is capable of preventing insects, pollutants, road debris and the like from contaminating the vehicle's engine cooling system, components.

It is another object of the present invention to provide a winterfront which provides uniform ram air flow and yet is mounted easily to the grill of a vehicle and which can be removed from the grill quickly for cleaning and/or storage.

It is still another object of the present invention to provide a winterfront assembly which is longer lasting than current winterfronts by securing the winterfront to a mountable frame by adhesive means.

It is yet another object of the present invention to provide a winterfront assembly which is easy to mount to and remove from a vehicle grill and which is inexpensive to manufacture.

Additional objects, advantages and novel features of the invention will be set forth in part of the description which follows, and in part will become apparent to those skilled in the art upon examination of the following specification or may be learned by practice of the invention.

These and other objects of the invention, as embodied and broadly described herein, are achieved by providing a winterfront assembly composed of a porous material, the porosity of the material being selectable in order to provide the desired restriction of cold air flow. The use of a winterfront assembly in the form of a porous material allows uniform flow of air across the full frontal area of the cooling system to ambient and ram air conditions and does not compromise the original flow configuration designed by the OEM. By providing a continuous and uniform flow, a winterfront assembly composed of a porous material will reduced mechanical and thermal stresses on the cooling system as well as reduce fan stresses, thereby resulting in decreased component fatigue and failure.

BRIEF DESCRIPTION OF THE DRAWINGS

The present invention will be better understood with reference to the appended drawing sheets, wherein.

DETAILED DESCRIPTION

Figure 1:
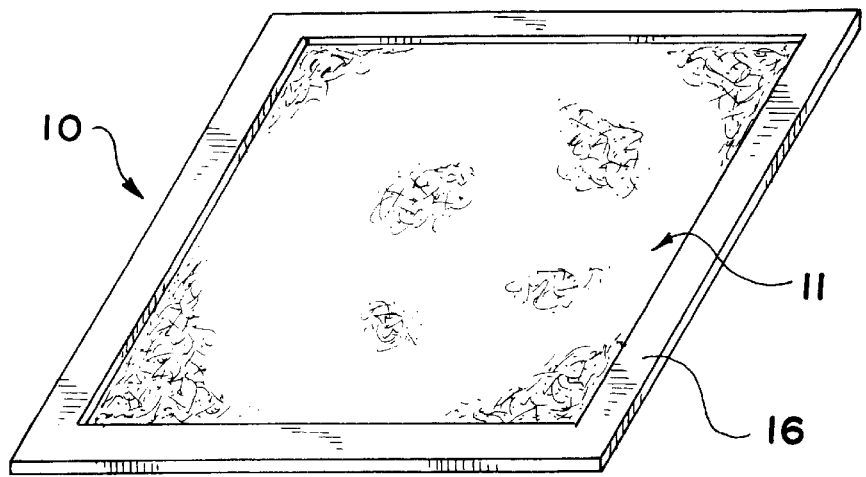
FIG. 1 is side perspective view of a winterfront of the present invention.

The present invention relates to a winterfront assembly composed of a porous material which is characterized as being able to restrict cold ram air impacting a vehicle grill, provide continuous and uniform air flow to the full frontal area of an engine's cooling system and endure under harsh and cold weather conditions. The porosity of the material can be selected to provide any air flow restriction equal to, less than or greater than the winterfront products currently available. That is, the porous material must be capable of providing the minimum amount of open air flow required by an engine's OEM. For example, a popular engine requires that 120 $in^2$ of a winterfront be open for use with the engine. Since a porous winterfront covers the entire grill, the porosity of the material would be calculated by dividing the required opening by the available grill area to determine the flow restriction required. In other words, if the engine requires a minimum of 10% air flow through the grill, then the porosity of the porous winterfront must be configured in such a manner that provides the required 10% air flow. It is to be understood that while there may be a direct correlation between the required air flow and the porosity of the selected material (i.e. 10% required air flow and 10% porosity), the actual porosity of the winterfront is dependent on the selected material, the type of porosity, and the overall porosity provided by the entire material. Thus, certain materials may require a porosity of 20%, for example, in order to achieve a 10% air flow.

Insofar as there are different air flow requirements for different cooling systems, the present invention offers the ability to provide a series of a winterfront assemblies having differing degrees of porosity in order to accommodate different grill areas and differing OEM air flow requirements. In this manner, rather than providing the current single winterfront with a specified opening or openings, or a winterfront having flaps for the user to create a specific opening, the winterfront assembly of the present invention can be designed to accommodate most any engine requirements, while achieving a restricted, yet uniform and continuous air flow across the engine's cooling system.

The porous winterfront assembly of the present invention can be in the form of any woven material, screen, fibrous web, non-woven web, perforated materials and combinations thereof that provide the characteristics described above. Suitable types of woven and nonwoven materials include metal, plastic and plastic coated metal (wire). Suitable plastic materials include, for example, monofilament and multifilament nylon, polyester and polypropylene. An example of a woven metal material is a 10 mesh, square, plain weave stainless steel woven material characterized as being capable of providing between from about 28 to about 86% restricted air flow. Another suitable material is 3M's "Type-T Clean and Finish, a non-woven fibrous web composed of a extruded fibers having a thickness of about 0.25" and which is characterized as being non-moisture absorbing and impervious to automotive contaminants and environmental pollution. An example of a non-woven web is Conwed Plastics' "Square Net", comprising extruded polypropylene strands and characterized by a nominal open area in the range of about 20 to about 78%, a thickness of about 0.014 to 0.310' and having between about 2.5 and 30 strands per square inch.

Suitable perforated materials include, for example, perforated sheets of stainless steel, aluminum, rubber-bound, plastic and composites. Such perforated materials can be configured with a range of perforated hole geometries, including square, slot/oblong, round or square corners, and triangle construction or combinations thereof. In addition, the perforated holes can be indented if desired. A specific product manufactured by Harrington and King, is a perforated material having a 0.20" staggered row configuration with 0.020" diameter holes on 0.043 centers with about 625 holes per square inch and providing about 20% of open area.

Figure 7:
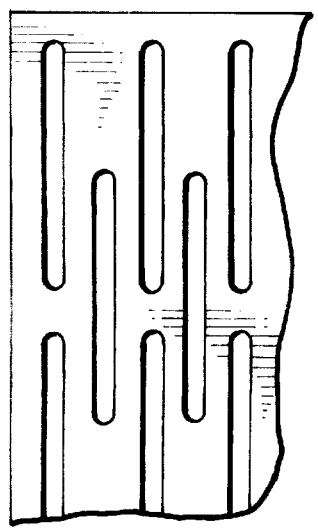
FIG. 7 is a side perspective view of an alternative winterfront of the present invention in the form of a perforated web.

A preferred perforated material is shown in FIG. 7 and is in the form of a plastic slotted material. The use of a slotted perforation provides a greater range in the "percent open" of the winterfront, while maintaining a reasonable opening for air to pass through. Preferably, the slotted perforation is an elongated slot, oriented perpendicular to the charge air heat exchanger and is side staggered.

Figure 8:
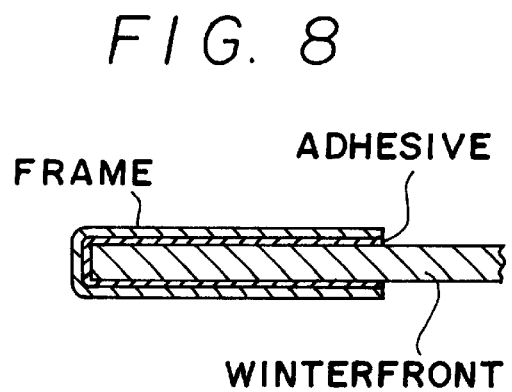
FIG. 8 is a side view of a winterfront assembly of the present invention showing the winterfront mounted to a frame.

In a first embodiment of the present invention, as shown in FIG. 1, the winterfront 10 comprises a porous material 11 which is bounded on its edges by a frame 16. The frame is provided with means well known in the art for mounting to the grill of a vehicle. Typically, current winterfronts are sewn to the frame. Although this mounting means is acceptable, the sewn stitching has inherent deficiencies, including breaking or otherwise pulling out of winterfront, thereby causing the product to fall apart, and in addition, sewing greatly increases the cost of manufacturing. Preferably, the winterfront of the present invention is to use an adhesive material to bond a border to the various components as shown in FIG. 8. The border material may be pre-processed with the adhesive and a backing applied thereto, thereby enabling quick assembly of any porous material to the frame.

Figure 2:
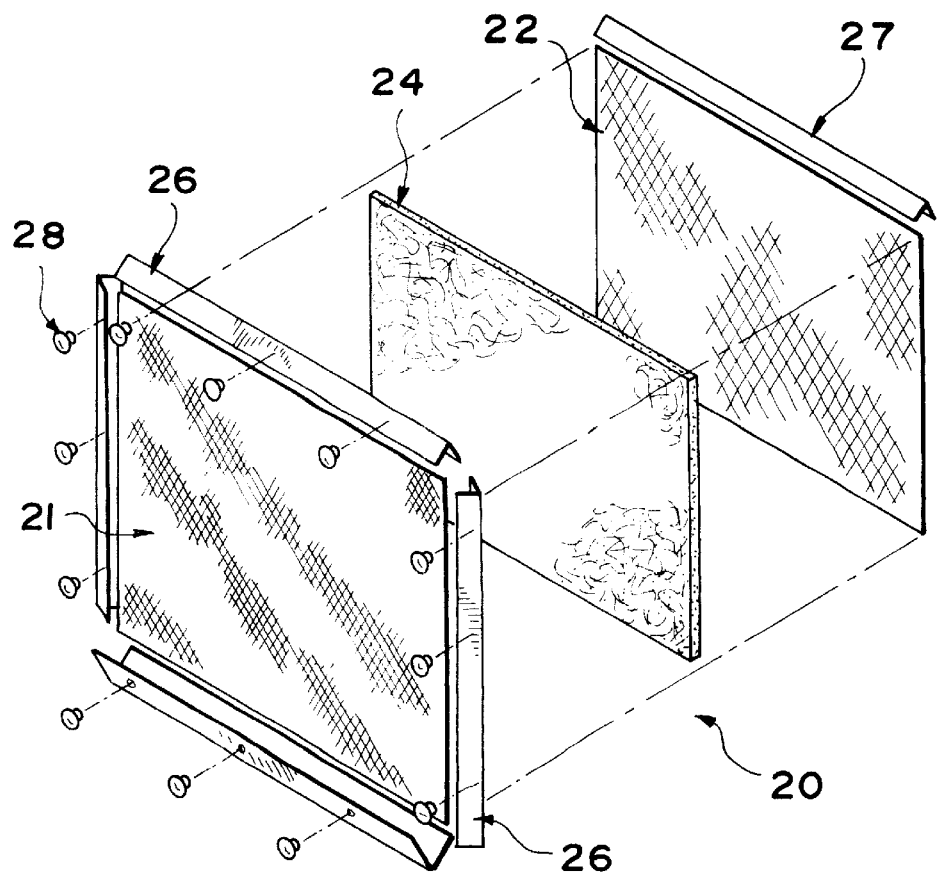
FIG. 2 is a side perspective view of an alternative winterfront of the present invention in the form of a composite structure.
Figure 3:
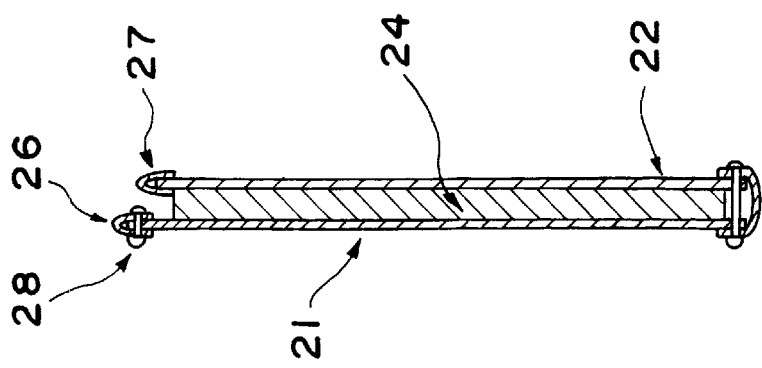
FIG. 3 illustrates a side view of the alternative embodiment shown in FIG. 2.

In a second embodiment of the present invention, as shown in FIG. 2, the winterfront 20 is a composite structure comprising outer screen layer 21, inner screen layer 22 and an intermediate porous layer 24. In this embodiment, it is the porosity of the intermediate layer that is selected to accommodate the desired OEM air flow requirement. The winterfront 20 also includes an outside frame 26, a top border element 27 and conventional snaps or grommets 28. To assemble the winterfront 20, border element 27 is fastened to inner screen 22, frame 26 is secured to both outer screen 21 and inner screen 22, the snaps or grommets 28 are installed to the frame 26 and the intermediate layer 24 is slid into the pocket created between the two screen layers, as shown in FIG. 3. The assembled winterfront is ready for mounting to a vehicle grill.

The two screen layers 21 and 22 can be of the same mesh, or can be of different mesh sizes. For example, outer screen layer 21 can be a fine screen layer similar to that currently available as bug screens while inner screen layer 22 can be of a coarser mesh. An advantage of the embodiment shown in FIGS. 2 and 3 is that the fibrous intermediate layer 24 which restricts air flow can be removed during non-winter operation, thereby leaving just the screen layers which then function as a bug screen and/or filter for road debris and other contaminants.

Although the primary purpose of the porous winterfront is to provide a restricted yet uniform air flow over the full frontal area of an engine's cooling system, the winterfront of the present invention also can function as a filter to reduce or prevent road dust, debris and other pollutants from entering the vehicle's engine cooling system.

The winterfront assembly of the present invention can be mounted to a vehicle grill by means well known in the art, including for example, snaps and bayonet type fasteners, hook and loop fasteners, bendable tabs which fasten to the grill non-invasively, or even behind the grill.

The porous materials suitable for use in the present invention should be of sufficient durability such that they can withstand cold and harsh weather environments as well as withstand pressure washing. Preferably, the winterfront is removable such that it can be sprayed from the opposite side to remove road debris. In the embodiment shown in FIGS. 2 and 3, layer 24 would be removed from the pocket created between the two screen layers, washed, and returned to the pocket.

Figure 4B:
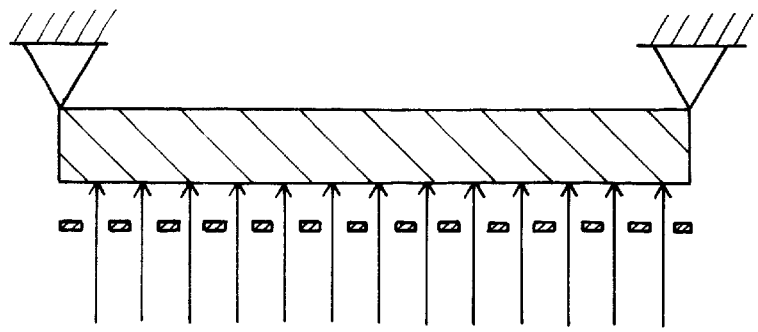
FIG. 4B shows how the porous winterfront of the present invention creates a distributed load.
Figure 4A:
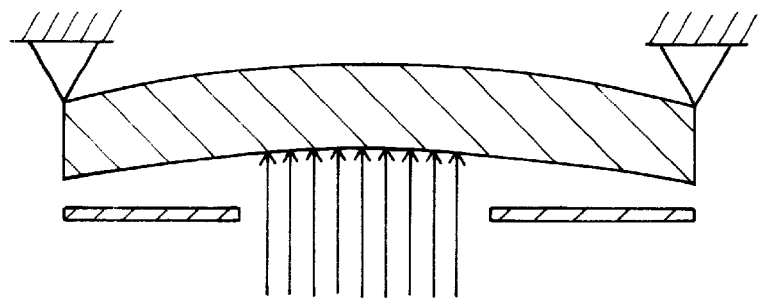
FIG. 4A shows how a conventional winterfront creates a concentrated load and causes mechanical stress.

Current winterfronts utilize an air-impervious plastic coated or tightly woven canvas so that air can only pass through holes disposed within the canvas. These prior art winterfronts concentrate the required air flow, thereby creating several stresses on the vehicle's cooling system. Referring to FIG. 4A, in prior art winterfronts, mechanical stress is caused by concentrating the flow of air through selected openings, thereby increasing mechanical bending stresses about the periphery, depicted as concentrated load. In comparison, as shown in FIG. 4B, the winterfront of the present invention provides a distributed load on the vehicle's cooling system thereby significantly reducing bending stress. Using a Finite Element Analysis (FEA) based on a concentrated load exposure of 10% versus a distributed load exposure of 90%, the same airflow load was concentrated on 10% exposure and distributed across the 90% exposure. The FEA showed that using a distributed load resulted in a 46% reduction in bending stress at the attachment about the periphery of the heat exchanger and a 55% reduction in core displacement in the center of the heat exchanger. Thus, the reduced mechanical loads on the cooling system components when using uniform airflow across the present winterfront assembly are a direct result of the distribution across the entire face of the system and provides an airflow nearly identical with the intended loading designed by the OEM.

Figure 5:
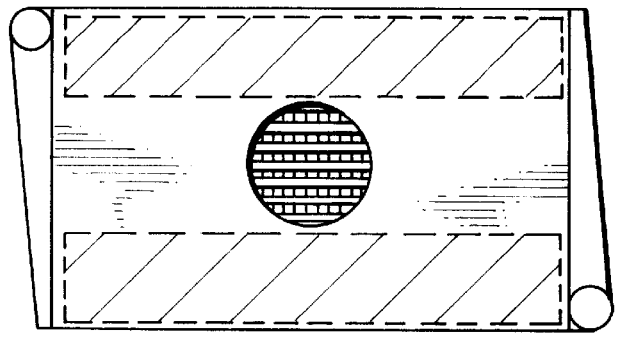
FIG. 5 shows how thermal stress is created by a conventional winterfront.
Figure 6:
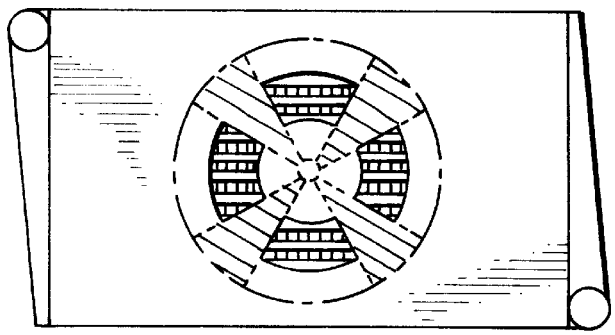
FIG. 6 shows how fan stress is created by a conventional winterfront.

Thermal stresses are induced in the CAC and radiator core when one or more core tubes are completely covered by a winterfront, thereby creating a temperature differential as shown in FIG. 5. FIG. 6 illustrates the creation of fan stress by the loading and unloading of the airfoil as it passes openings disposed in the winterfront. Since the porous winterfront of the present invention provides for an even and uniform air flow distribution across the full frontal area of the grill and cooling system, thermal and fan stresses are greatly reduced or eliminated.

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A winterfront comprising a frame element mountable to the grill of a vehicle, and at least one porous material retained within said frame element, wherein said porous material is characterized as being able to restrict cold ram air impacting a vehicle grill from entering an engine's cooling system in order to prevent the engine's heat exchanger assemblies from overcooling during cold weather conditions, while providing a continuous and uniform air flow to the full frontal area of an engine's cooling system and endure under harsh and cold weather conditions, wherein the total porosity of said at least one porous material is capable of providing the optimal minimum air flow restriction required by an engine's original equipment manufacturer.

2. A winterfront in accordance with claim 1, wherein said porous material is a metal, plastic or plastic-coated metal material selected from the group consisting of woven material, non-woven material, fibrous web, screen, perforated material and combinations thereof.

3. A winterfront in accordance with claim 2, wherein said porous material comprises at least one screen and at least one fibrous web.

4. A winterfront in accordance with claim 3, wherein said porous material comprises two screens and wherein said fibrous web is sandwiched between said two screens.

5. A winterfront in accordance with claim 4, wherein said fibrous web is removable from between said two screens.

6. A winterfront in accordance with claim 4, wherein one of said two screens has a finer mesh size than the other of said two screens.

7. A winterfront comprising a frame element mountable to the grill of a vehicle, an inner screen and an outer screen retained within said frame element in such a manner that a pocket is formed between said inner screen and said outer screen, and at least one porous material removably retained within said pocket, wherein said porous material is characterized as being able to restrict cold ram air impacting a vehicle grill from entering an engine's cooling system in order to prevent the engine's heat exchanger assemblies from over-cooling during cold weather conditions, while providing a continuous and uniform air flow to the full frontal area of an engine's cooling system and endure under harsh and cold weather conditions, wherein the total porosity of said inner screen, said outer screen and said at least one porous material is capable of providing the optimal minimum air flow restriction required by an engine's original equipment manufacturer (OEM).

8. A winterfront in accordance with claim 7, wherein said outer screen has a mesh size less than that of said inner screen.

9. A winterfront in accordance with claim 8, wherein said porous material is a metal, plastic or plastic-coated metal material selected from the group consisting of woven material, non-woven material, fibrous web, screen, perforated and combinations thereof.

10. A winterfront in accordance with claim 7, wherein the porosity of said porous material is selected to provide the optimum air flow restriction required by an engine's OEM.

11. A winterfront in accordance with claim 2, wherein said perforated material is a plastic slotted material comprising a plurality of elongated slots arranged in a series of rows, the slots in each of said series of rows being staggered relative to the slots in an adjacent row.

12. A winterfront in accordance with claim 1, wherein said at least one porous material is retained to said frame element by means of an adhesive material.

13. A winterfront in accordance with claim 7, wherein said porous material is a plastic slotted material comprising a plurality of elongated slots arranged in a series of rows, the slots in each of said series of rows being staggered relative to the slots in an adjacent row.

14. A winterfront in accordance with claim 7, wherein said inner screen, said outer screen and said at least one porous material are retained within said frame element by means of an adhesive material.

* * * * *